United States Patent
Khan

(10) Patent No.: US 10,194,327 B1
(45) Date of Patent: Jan. 29, 2019

(54) 5G RADIO SYSTEM USING SUB-7 GHZ SPECTRUM FOR UPLINK AND MILLIMETER WAVE SPECTRUM FOR DOWNLINK

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/784,021

(22) Filed: Oct. 13, 2017

(51) Int. Cl.
*H04W 16/28* (2009.01)
*H04W 16/14* (2009.01)
*H04W 72/04* (2009.01)
*H04L 27/26* (2006.01)
*H04W 88/08* (2009.01)

(52) U.S. Cl.
CPC ......... *H04W 16/14* (2013.01); *H04L 27/2626* (2013.01); *H04W 72/0406* (2013.01); *H04W 72/0453* (2013.01); *H04W 88/08* (2013.01)

(58) Field of Classification Search
CPC . H04W 28/20; H04W 48/16; H04W 72/0453; H04W 16/28; H04W 28/26; H04W 48/12; H04W 72/042; H04W 72/0446; H04W 88/02; H04W 36/0055; H04W 36/14; H04W 40/12; H04W 40/244; H04W 48/08; H04W 4/005; H04W 72/02; H04W 72/04; H04W 72/0406; H04W 72/044; H04W 72/046; H04W 72/12; H04W 74/02; H04W 76/046; H04W 76/27; H04W 84/005; H04W 84/12; H04W 84/20; H04W 88/06; H04W 88/18; H04W 8/24; H04L 1/0003; H04L 1/0009; H04L 1/0061; H04L 1/007; H04L 1/0079; H04L 1/0086; H04L 1/1607; H04L 1/1614; H04L 1/1877; H04L 27/2039; H04L 27/2332; H04L 5/0007; H04L 7/0331

USPC ..... 370/336, 338, 343, 345; 455/422.1, 450, 455/73

See application file for complete search history.

(56) References Cited

U.S. PATENT DOCUMENTS

| | | | | |
|---|---|---|---|---|
| 2006/0264210 | A1* | 11/2006 | Lovberg | H04W 92/20 455/422.1 |
| 2008/0013519 | A1* | 1/2008 | Kwon | H04J 3/1682 370/345 |
| 2008/0049707 | A1* | 2/2008 | Kwon | H04L 1/0079 370/343 |
| 2008/0051097 | A1* | 2/2008 | Kwon | H04W 72/02 455/450 |
| 2008/0112368 | A1* | 5/2008 | Kwon | H04W 72/0406 370/336 |

(Continued)

*Primary Examiner* — Nathan S Taylor
(74) *Attorney, Agent, or Firm* — Michael A. Rahman

(57) ABSTRACT

A method of communication by a wireless communication device includes receiving millimeter wave band downlink signals having a large subcarrier spacing, and transmitting sub-7 GHz band uplink signals having a small subcarrier spacing. The millimeter wave band downlink signals have a large bandwidth, and the sub-7 GHz band uplink signals have a small bandwidth. The millimeter wave band downlink signals have a subcarrier spacing of 120 KHz-480 KHz range, and the sub-7 GHz band uplink signals have a subcarrier spacing of 15 KHz-60 KHz range. The sub-7 GHz band downlink signals have a bandwidth of 100 MHz or less, and the millimeter wave band downlink signals typically have a bandwidth of 200 MHz-800 MHz range.

10 Claims, 7 Drawing Sheets

(56) References Cited

U.S. PATENT DOCUMENTS

| | | | |
|---|---|---|---|
| 2008/0112369 A1* | 5/2008 | Kwon | H04W 28/20 370/336 |
| 2008/0112370 A1* | 5/2008 | Kwon | H04W 28/20 370/336 |
| 2008/0244352 A1* | 10/2008 | Kwon | H04L 1/1607 714/748 |
| 2008/0247371 A1* | 10/2008 | Kwon | H04W 8/24 370/338 |
| 2011/0075713 A1* | 3/2011 | Lovberg | H04L 27/2039 375/219 |
| 2015/0004918 A1* | 1/2015 | Wang | H04W 88/02 455/73 |
| 2016/0337906 A1* | 11/2016 | Cordeiro | H04W 28/20 |
| 2016/0337916 A1* | 11/2016 | Deenoo | H04W 8/22 |
| 2018/0007673 A1* | 1/2018 | Fwu | H04W 4/70 |
| 2018/0109282 A1* | 4/2018 | Khan | H04B 1/401 |

* cited by examiner

5G RADIO SYSTEM USING SUB-7 GHZ SPECTRUM FOR UPLINK AND MILLIMETER WAVE SPECTRUM FOR DOWNLINK

BACKGROUND

The invention relates to wireless communications, and in particular relates to a 5G radio system using sub-7 GHz spectrum in the uplink for communication from devices to a radio base station and millimeter wave spectrum above 24 GHz in the downlink for communication from the radio base station to the devices.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications.

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
| | 29.1-29.25 | 0.150 |
| | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
| | 42.0-42.5 | 0.500 |
| 60 GHz | 57-64 | 7.000 |
| | 64-71 | 7.000 |
| 70/80 GHz | 71-76 | 5.000 |
| | 81-86 | 5.000 |
| 90 GHz | 92-94 | 2.900 |
| | 94.1-95.0 | |
| 95 GHz | 95-100 | 5.000 |
| 105 GHz | 102-105 | 7.500 |
| | 105-109.5 | |

TABLE 1-continued

Examples of millimeter wave bands

| Bands [GHz] | Frequency [GHz] | Bandwidth [GHz] |
|---|---|---|
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
| | 155.5-158.5 | |
| | 158.5-164 | |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum.

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The Fourth Generation Long Term Evolution (4G LTE) system and local area network (LAN) standard called Wi-Fi use orthogonal frequency-division multiplexing (OFDM) for encoding digital data on multiple carrier frequencies. A large number of closely spaced orthogonal sub-carriers are modulated with conventional modulation schemes such as BPSK, QPSK, 16-QAM, 64-QAM and 256-QAM. The next generation of wireless WAN standard referred to as 5G New Radio (NR) also uses orthogonal frequency-division multiplexing (OFDM).

SUMMARY

According to disclosed embodiments, a method of communication by a wireless communication device includes receiving millimeter wave band downlink signals having a large subcarrier spacing, and transmitting sub-7 GHz band uplink signals having a small subcarrier spacing. The millimeter wave band downlink signals have a large bandwidth, and the sub-7 GHz band uplink signals have a small bandwidth. The millimeter wave band downlink signals have a subcarrier spacing of 120 KHz-480 KHz range, and the sub-7 GHz band uplink signals have a subcarrier spacing of 15 KHz-60 KHz range. The sub-7 GHz band downlink signals have a bandwidth of 100 MHz or less, and the millimeter wave band downlink signals typically have a bandwidth of 200 MHz-800 MHz range.

According to disclosed embodiments, a method of communication by a radio base station includes transmitting millimeter wave band downlink signals having a large subcarrier spacing, and receiving sub-7 GHz band uplink signals having a small subcarrier spacing. The millimeter wave band downlink signals have a large bandwidth, and the sub-7 GHz band uplink signals have a small bandwidth. The millimeter wave band downlink signals have a subcarrier spacing of 120 KHz-480 KHz range, and sub-7 GHz band uplink signals have a subcarrier spacing of 15 KHz-60 KHz range. The sub-7 GHz band downlink signals have a bandwidth of 100 MHz or less, and the millimeter wave band downlink signals have a bandwidth of 200 MHz-800 MHz range.

According to disclosed embodiments, a radio base station includes a first transmitter configured to transmit millimeter wave band downlink signals having a large subcarrier spacing, and a first receiver configured to receive sub-7 GHz uplink signals having a small subcarrier spacing. The first transmitter includes a first signal processing circuit configured to generate the millimeter wave band downlink signals, a power amplifier configured to amplify the millimeter wave band downlink signals, and a transmit antenna array configured to transmit the millimeter wave band downlink signals. The first receiver includes an antenna array configured to receive the sub-7 GHz band uplink signals, a low noise amplifier configured to amplify the sub-7 GHz band uplink signals, and a second signal processing circuit configured to process the sub-7 GHz band uplink signals.

According to disclosed embodiments, a communication device includes a first receiver configured to receive millimeter wave band downlink signals having a large subcarrier spacing, and a first transmitter configured to transmit sub-7 GHz uplink signals having a small subcarrier spacing. The first transmitter includes a first signal processing circuit configured to generate the sub-7 GHz band uplink signals, a power amplifier configured to amplify the sub-7 GHz band uplink signals, and a transmit antenna array configured to transmit the sub-7 GHz band uplink signals. The first receiver includes an antenna array configured to receive the millimeter wave band downlink signals, a low noise amplifier configured to amplify the millimeter wave band downlink signals, and a second signal processing circuit configured to process the millimeter wave band downlink signals.

According to disclosed embodiments, a radio base station includes a transmitter configured to transmit a millimeter wave band signal. The transmitter includes a first signal processing circuit configured to generate the millimeter wave band signal using Orthogonal Frequency Division Multiplexing (OFDM) with a larger subcarrier spacing. The transmitter also includes a power amplifier configured to amplify the millimeter wave band signal and a high gain transmit antenna array configured to transmit the first millimeter wave band signal. The radio base station also includes a receiver configured to receive a sub-7 GHz signal. The receiver also includes a receive antenna array configured to receive the sub-7 GHz signal and a low noise amplifier configured to amplify the sub-7 GHz signal. The receiver also includes a second signal processing circuit configured to process the sub-7 GHz signal using Orthogonal Frequency Division Multiplexing (OFDM) with a smaller subcarrier spacing.

According to some disclosed embodiments, the transmit antenna array is a multiple input multiple output (MIMO) transmit antenna array configured to transmit multiple spatial streams in the millimeter wave spectrum, and the receive antenna array is a multiple input multiple output receive antenna array configured to receive multiple spatial streams in the sub-7 GHz spectrum.

According to disclosed embodiments, a communication device includes a transmitter configured to transmit a sub-7 GHz signal. The transmitter includes a first signal processing circuit configured to generate the sub-7 GHz signal using Orthogonal Frequency Division Multiplexing (OFDM) with a smaller subcarrier spacing. The transmitter also includes a power amplifier configured to amplify the sub-7 GHz signal and a high gain transmit antenna array configured to transmit the sub-7 GHz signal. The communication device also includes a receiver configured to receive a millimeter wave band signal. The receiver also includes a receive antenna array configured to receive the millimeter wave band signal and a low noise amplifier configured to amplify the millimeter wave band signal. The receiver also includes a second signal processing circuit configured to process the millimeter wave band signal using Orthogonal Frequency Division Multiplexing (OFDM) with a larger subcarrier spacing.

According to some disclosed embodiments, the transmit antenna array is a multiple input multiple output (MIMO) transmit antenna array configured to transmit multiple spatial streams in the sub-7 GHz spectrum, and the high receive gain antenna array is a multiple input multiple output receive antenna array configured to receive multiple spatial streams in the millimeter wave spectrum.

According to disclosed embodiments, a method includes generating, by a radio base station, a millimeter wave band signal using OFDM with larger subcarrier spacing and amplifying the millimeter wave band signal. The method includes transmitting to a communication device on a millimeter wave band, by the radio base station, the millimeter wave band signal using a multiple input multiple output transmit antenna array. The method includes receiving by the radio base station, from a communication device, a sub-7 GHz signal using a multiple input multiple output receive antenna array and amplifying and processing the sub-7 GHz signal using OFDM with smaller subcarrier spacing.

According to disclosed embodiments, a method includes generating, by a communication device, a sub-7 GHz band signal using OFDM with smaller subcarrier spacing and amplifying the sub-7 GHz band signal. The method includes transmitting to a radio base station on a sub-7 GHz band, by the communication device, the sub-7 GHz band signal using a multiple input multiple output transmit antenna array. The method includes receiving by the communication device, from a radio base station, a millimeter wave band signal using a multiple input multiple output receive antenna array and amplifying and processing the millimeter wave band signal using OFDM with smaller subcarrier spacing.

DETAILED DESCRIPTION

According to disclosed embodiments, a wireless system uses sub-7 GHz spectrum in the uplink for communication from communication devices to a radio base station and millimeter wave spectrum above 24 GHz in the downlink for communication from the radio base station to the communication devices. The millimeter wave signals from the radio base station are created and transmitted using orthogonal frequency division multiplexing (OFDM) with a larger subcarrier spacing. The millimeter wave signals are received and processed by the communication devices using OFDM with a larger subcarrier spacing. The sub-7 GHz signals from the communication devices are created and transmitted using orthogonal frequency division multiplexing (OFDM) with a smaller subcarrier spacing. The sub-7 GHz signals are received and processed by the radio base station using OFDM with a smaller subcarrier spacing. The radio base stations, also referred to as gNode Bs, are connected to the Internet via wired backhaul such as optical fiber communication link.

Figure 1:
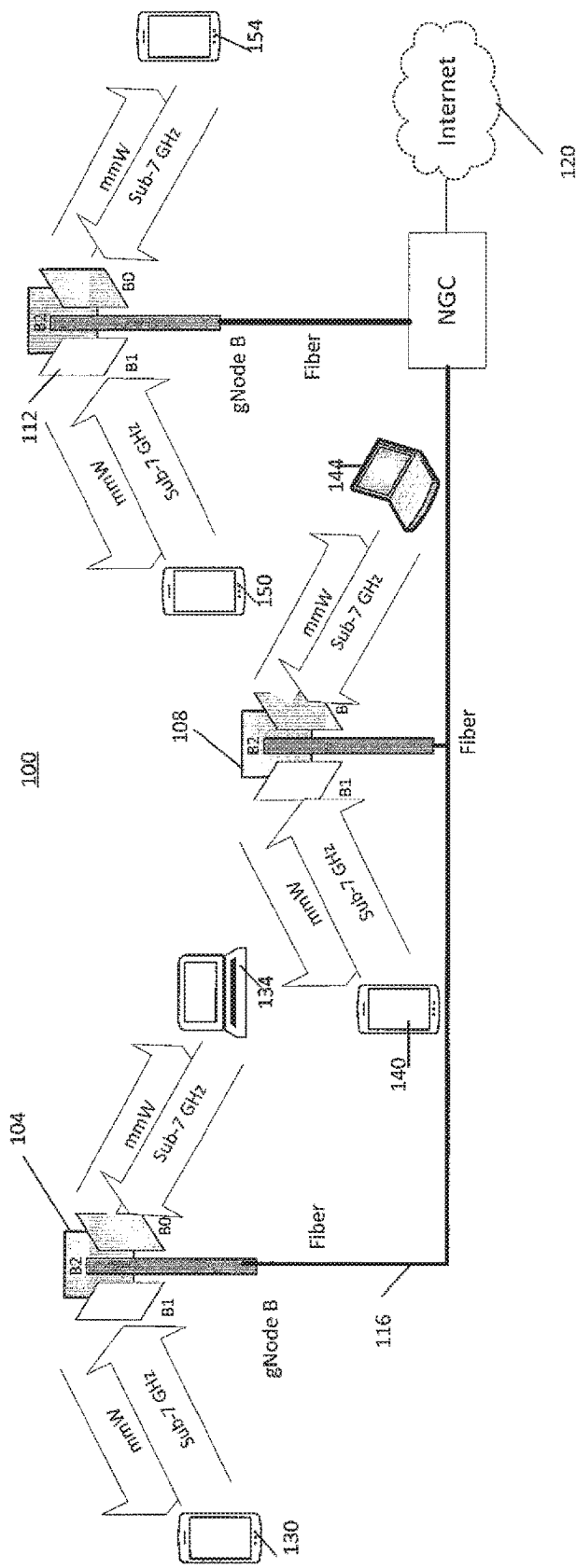
FIG. 1 illustrates an exemplary wireless communication system in accordance with disclosed embodiments.

FIG. 1 illustrates a wireless communication system 100 in accordance with disclosed embodiments. The wireless system 100 uses sub-7 GHz spectrum in the uplink for communication from communication devices to a radio base station and millimeter wave spectrum above 24 GHz in the downlink for communication from the radio base station to the communication devices.

Referring to FIG. 1, the system 100 includes radio base stations 104, 108 and 112 (also referred to as gNode Bs) that communicate with communication devices on millimeter wave spectrum frequency in the downlink and sub-7 GHz spectrum frequency in the uplink. The radio base stations 104, 108 and 112 are connected to a communication network (e.g., Next Generation Core (NGC)) 116 via a communication link (e.g., high-speed Fiber backhaul link). The communication network 116 may be connected to the Internet 120. The radio base station 104 serves communication devices 130 and 134, the radio base station 108 serves communication devices 140 and 144 and the radio base station 112 serves communication devices 150 and 154. The communication devices may, for example, be smartphones, laptop computers, desktop computers, augmented reality/virtual reality (AR/VR) devices or any other communication devices.

Figure 2:
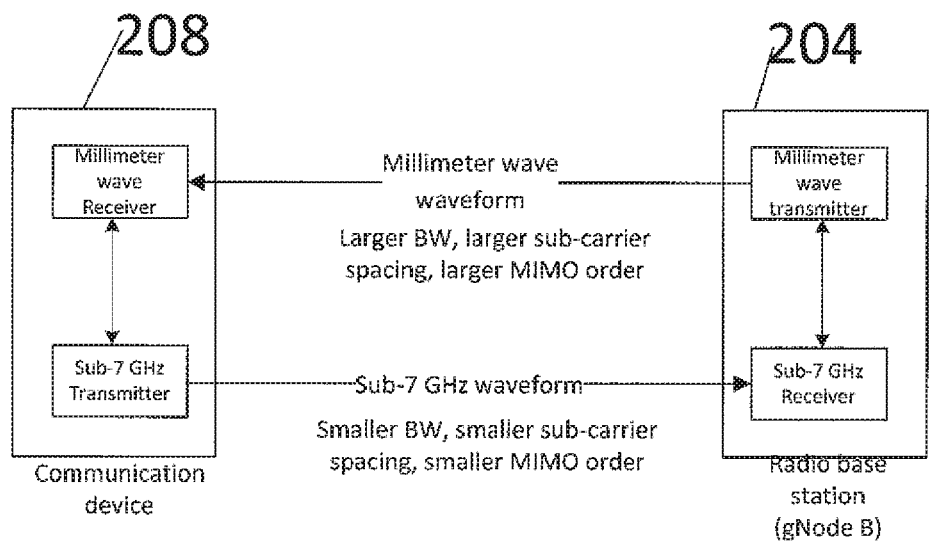
FIG. 2 is a block diagram of transmit and receive chains in a radio base station and in a communication device.

FIG. 2 is a block diagram of transmit and receive chains in a radio base station 204 and a communication device 208 according to some disclosed embodiments. A physical layer waveform optimized for millimeter wave frequency spectrum is used in the downlink for communication between the radio base station 204 and the communication device 208 while a physical layer waveform optimized for sub-7 GHz frequency spectrum is used in the uplink for communication between the communication device 208 and the radio base station 204.

A physical layer waveform optimized for millimeter wave frequency spectrum may, for example, use a larger bandwidth and larger sub-carrier spacing compared to the bandwidth and sub-carrier spacing used for the sub-7 GHz frequency spectrum. For example, a waveform optimized for millimeter wave frequency spectrum may use 120 KHz-480 KHz range sub-carrier spacing while a waveform optimized for sub-7 GHz frequency spectrum may use a 15 KHz-60 KHz range sub-carrier spacing. A larger sub-carrier spacing provides robustness against elevated phase noise and other degradations typically experienced at millimeter wave frequencies. Moreover, a waveform optimized for millimeter wave frequency may support large multi-user MIMO (Multiple Input Multiple Output) order such as the case for massive MIMO to provide beamforming and spatial multiplexing from the radio base station 204 gNode B towards a large number of communication devices. A physical layer waveform optimized for sub-7 GHz frequency spectrum may not need to support very large MIMO orders to reduce complexity at the communication devices.

In general, the doubling of the output of a frequency synthesizer increases phase noise by 6 dB. For example, a signal at 24 GHz will experience 18 dB greater phase noise compared to a signal at 3 GHz. An OFDM system with larger sub-carrier spacing is more robust to phase noise impairments compared to a system with a smaller subcarrier spacing. However, a larger subcarrier spacing results in smaller OFDM symbol duration increasing the cyclic prefix (CP) overhead. This tradeoff between robustness to phase noise and overhead requires using a smaller subcarrier spacing at sub-7 GHz frequencies and a relatively larger subcarrier spacing at millimeter wave frequencies.

Figure 3:
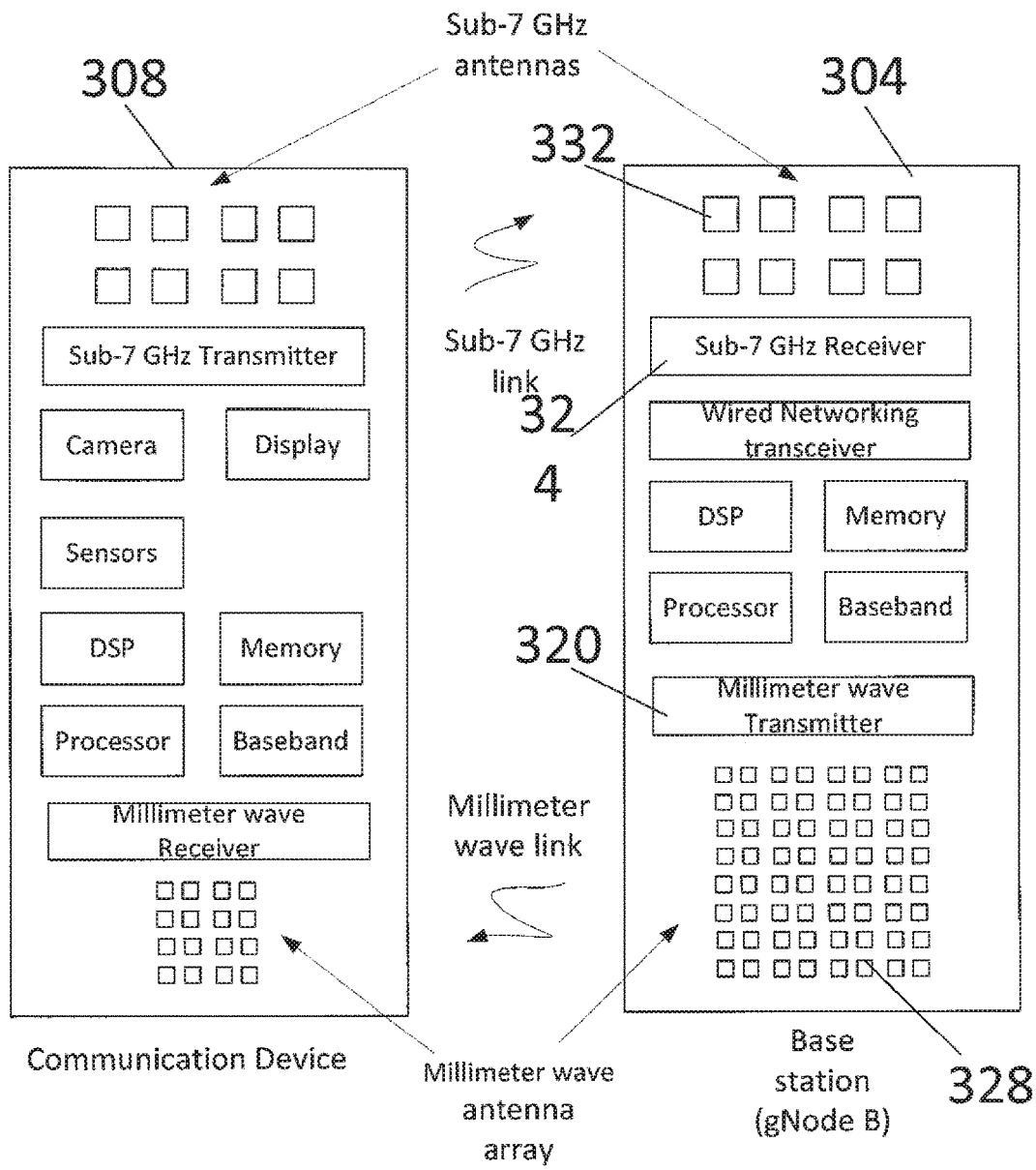
FIG. 3 is a functional block diagram of a radio base station and a communication device.

FIG. 3 is a functional block diagram of a radio base station 304 gNode B and a communication device 308. The radio base station 304 includes a millimeter wave transmitter 320 for signal transmissions to the communication device 308 over the millimeter wave spectrum and a sub-7 GHz receiver 324 for receiving signals from the communication device 308 over the sub-7 GHz spectrum. The radio base station gNode B also includes a millimeter wave antenna array 328 at one or more of the millimeter wave bands such as 26, 28, 37 and 39 GHz bands for signal transmission over the millimeter wave spectrum and a sub-7 GHz antenna array 332 at one or more of the sub-7 GHz bands such as 3.5-4.2 GHz licensed or 5 GHz unlicensed bands for signal reception over the sub-7 GHz spectrum. The radio base station 304 also includes a baseband processor, a digital signal processor (DSP), a communications protocol processor, a memory, and networking and routing modules.

The communication device 308 includes a millimeter wave receiver 340 for receiving millimeter wave signals from the radio base station 308 and a sub-7 GHz transmitter 344 for transmitting signals in the sub-7 GHz spectrum to the radio base station 304. The communication device 308 also includes a millimeter wave antenna array 348 at one or more of the millimeter wave bands such as 26, 28, 37 and 39 GHz bands for signal reception from the radio base station 304 over the millimeter wave spectrum and a sub-7 GHz antenna array 352 at one or more of the sub-7 GHz bands such as 3.5-4.2 GHz licensed or 5 GHz unlicensed bands for signal transmission to the radio base station 304 over the sub-7 GHz spectrum. The communication device 308 also includes a baseband processor, a digital signal processor (DSP), a communications protocol processor, a memory and networking components. The communication device may also include additional functionalities such as various sensors, a display and a camera.

Figure 4:
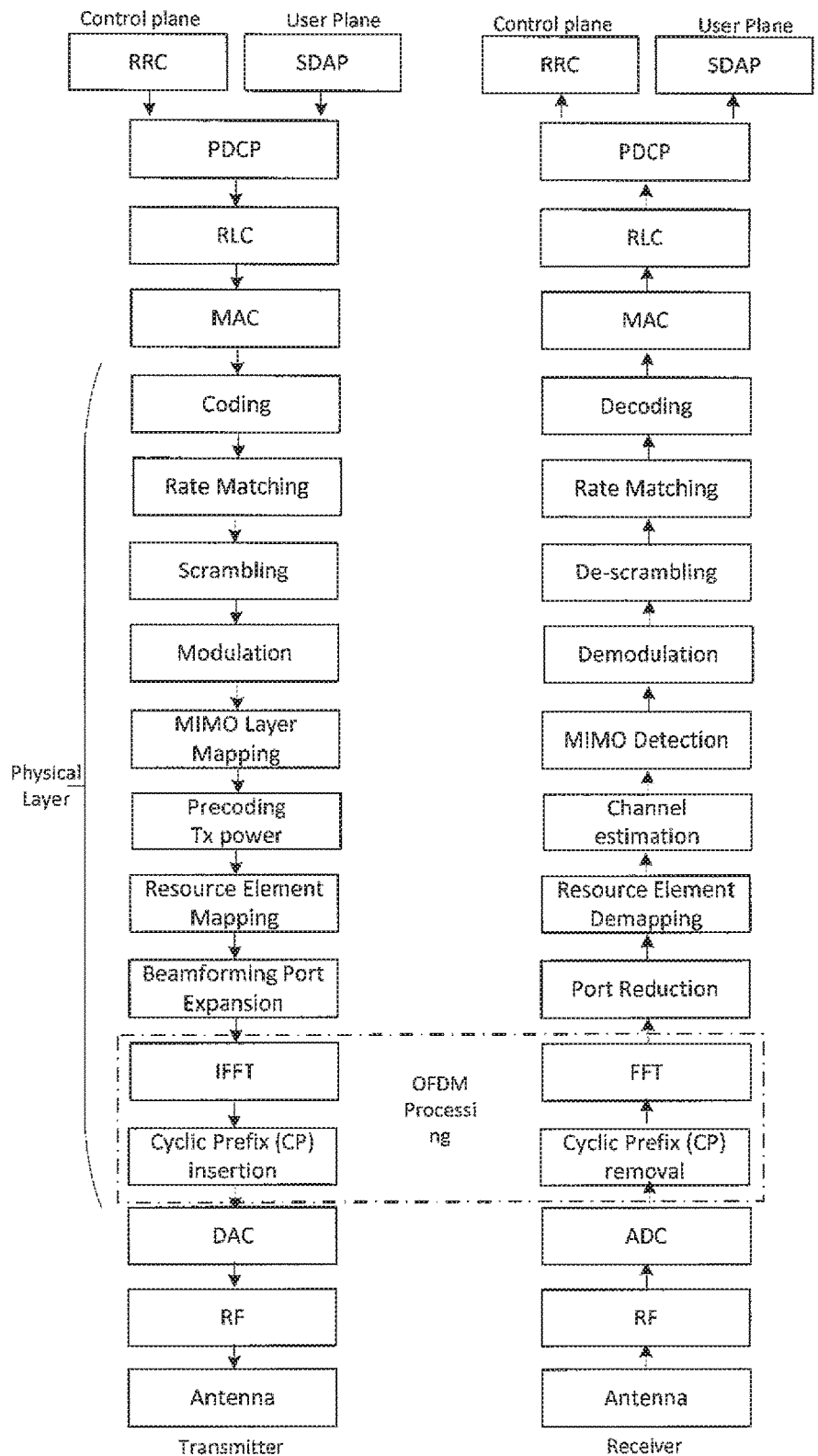
FIG. 4 is a block diagram of a transmitter and a receiver.

FIG. 4 is a block diagram of a transmitter 404 and a receiver 408 according to disclosed embodiments. The transmitter 404 and the receiver 406 includes a physical layer, a Medium Access Control (MAC), a Radio Link Control (RLC), and a Packet Data Convergence Protocol (PDCP), and a Service Data Adaptation Protocol (SDAP). A control plane includes a Radio Resource Control (RRC) on top of the PDCP layer.

According to disclosed embodiments, OFDM processing is done as part of the physical layer before digital-to-analog (DAC) conversion in the transmitter 404 and after analog-to-digital conversion (ADC) in the receiver 408. As part of the OFDM processing at the transmitter 404, an Inverse Fast Fourier Transform (IFFT) operation is performed and a cyclic prefix (CP) is added to the transformed symbols. As part of the OFDM processing at the receiver 408, a cyclic prefix (CP) is removed and a Fast Fourier Transform (FFT) operation is performed to generate the modulation symbols. The number of sub-carriers in an OFDM system is equal to the IFFT/FFT size. For a fixed total bandwidth, a larger IFFT/FFT size generates a smaller sub-carrier spacing while a smaller IFFT/FFT size will generate a larger sub-carrier spacing. Therefore, the sub-carrier spacing can be adjusted by changing the size of the IFFT/FFT.

Figure 5:
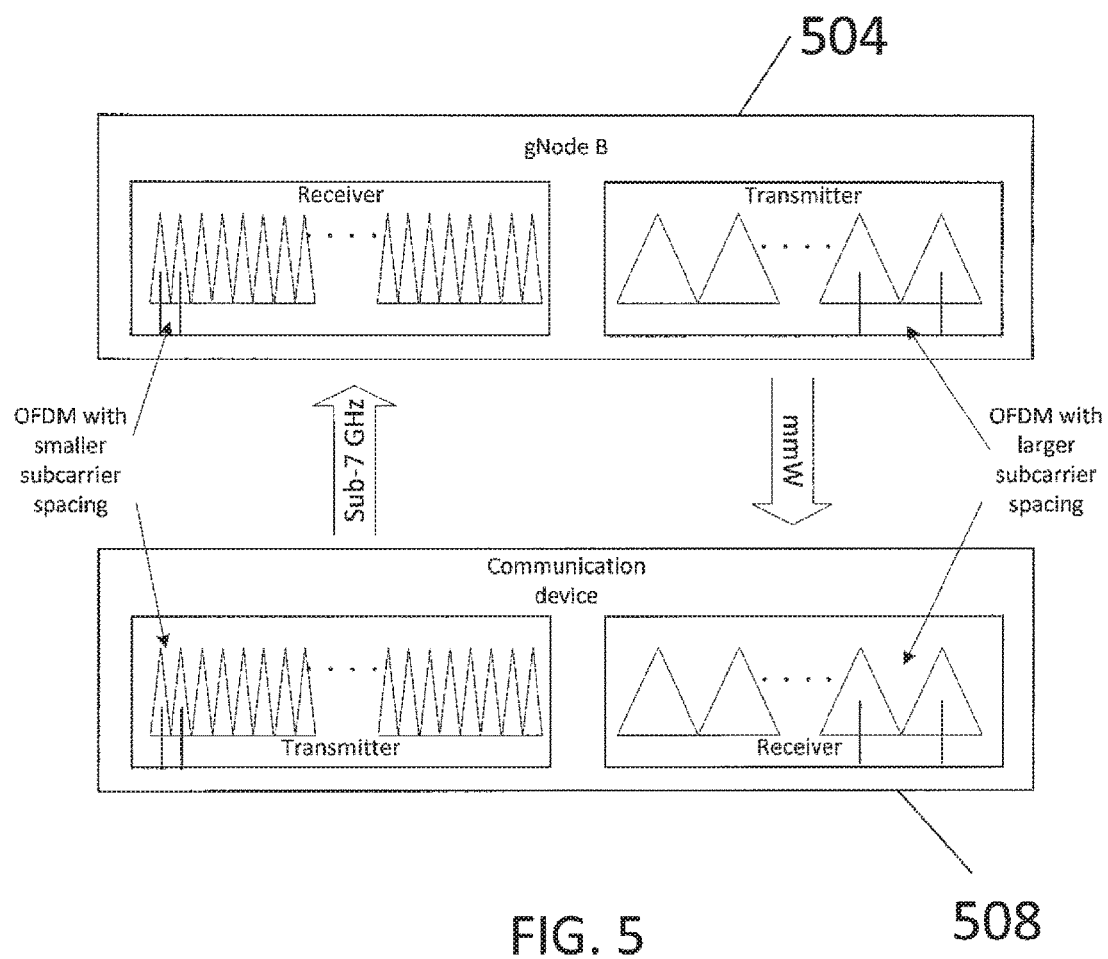
FIGS. 5-6 illustrate communication between a radio base station and a communication device.

FIG. 5 illustrates communication between a radio base station 504 and a communication device 508 according to some disclosed embodiments. The radio base station 504, also referred to as gNode B, transmits signals to the communication device 508 in the millimeter wave spectrum using OFDM with a larger subcarrier spacing (e.g., 120 KHz-480 KHz range). The communication device 508 processes the received signals from the radio base station 504 using OFDM with a larger subcarrier spacing (e.g., 120 KHz-480 KHz range). The communication device 508 transmits signals to the radio base station 504 in the sub-7 GHz spectrum using OFDM with a smaller subcarrier spacing (e.g., 15 KHz-60 KHz range). The radio base station 504 processes the received signals from the communication device 508 using OFDM with a smaller subcarrier spacing (e.g., 15 KHz-60 KHz range).

Figure 6:
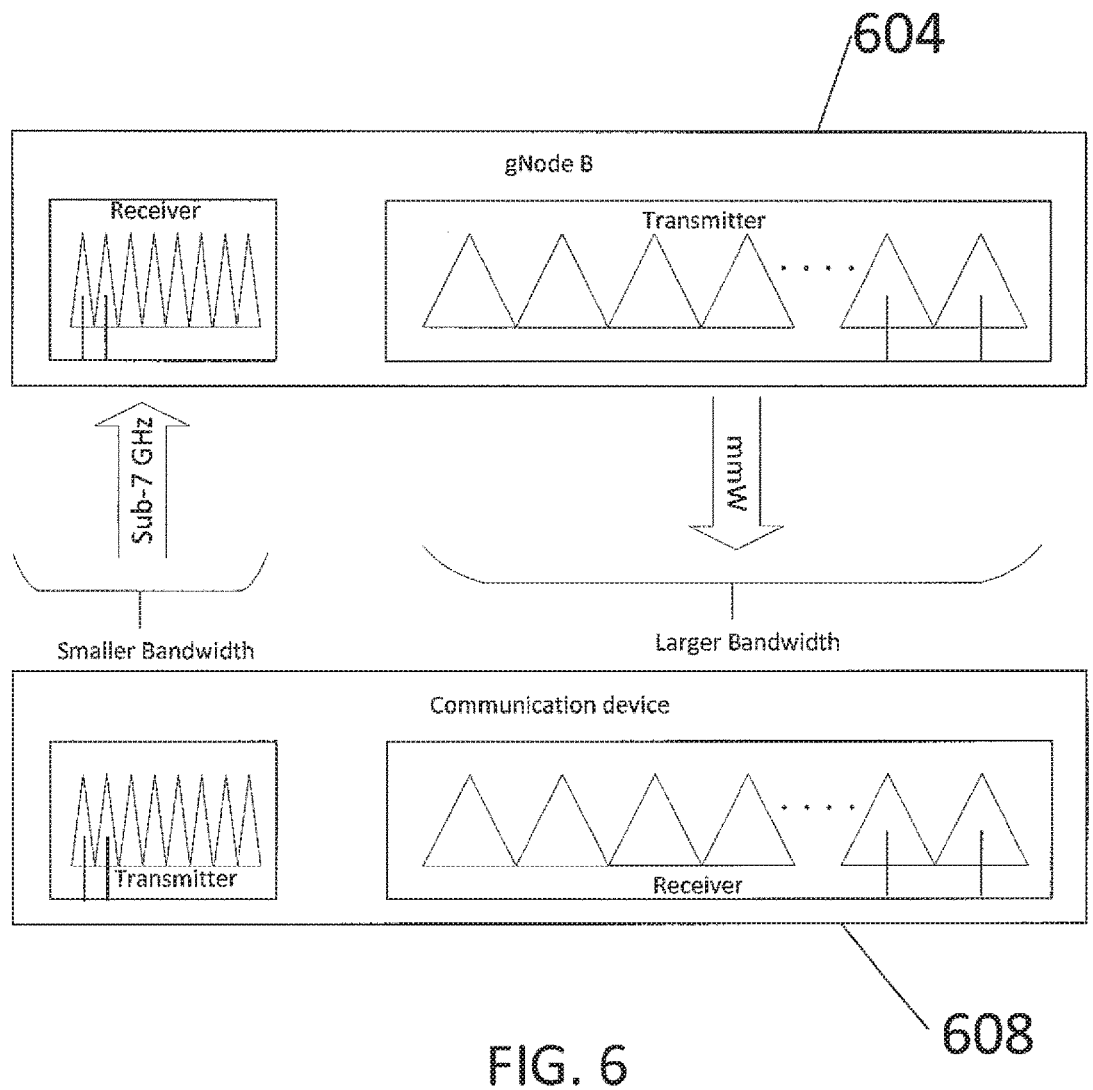

FIG. 6 illustrates communication between a radio base station 604 and a communication device 608 according to other disclosed embodiments. The radio base station 604 transmits signals to the communication device 608 in the millimeter wave spectrum using OFDM with a larger sub-carrier spacing (e.g., 120 KHz-480 KHz range) and a larger bandwidth (e.g., 200 MHz-800 MHz range). The communication device 608 processes the received signals from the radio base station 604 using OFDM with a larger subcarrier spacing (e.g., 120 KHz-480 KHz range) and a larger bandwidth (e.g., 200 MHz-800 MHz range). The communication device 608 transmits signals to the radio base station 604 in the sub-7 GHz spectrum using OFDM with a smaller subcarrier spacing (e.g., 15 KHz-60 KHz range) and a smaller bandwidth such as, for example 100 MHz or less. The radio base station 604 processes the received signals from the communication device 608 using OFDM with a smaller subcarrier spacing (e.g., 15 KHz-60 KHz range) and a smaller bandwidth such as, for example, 100 MHz or less.

Figure 7:
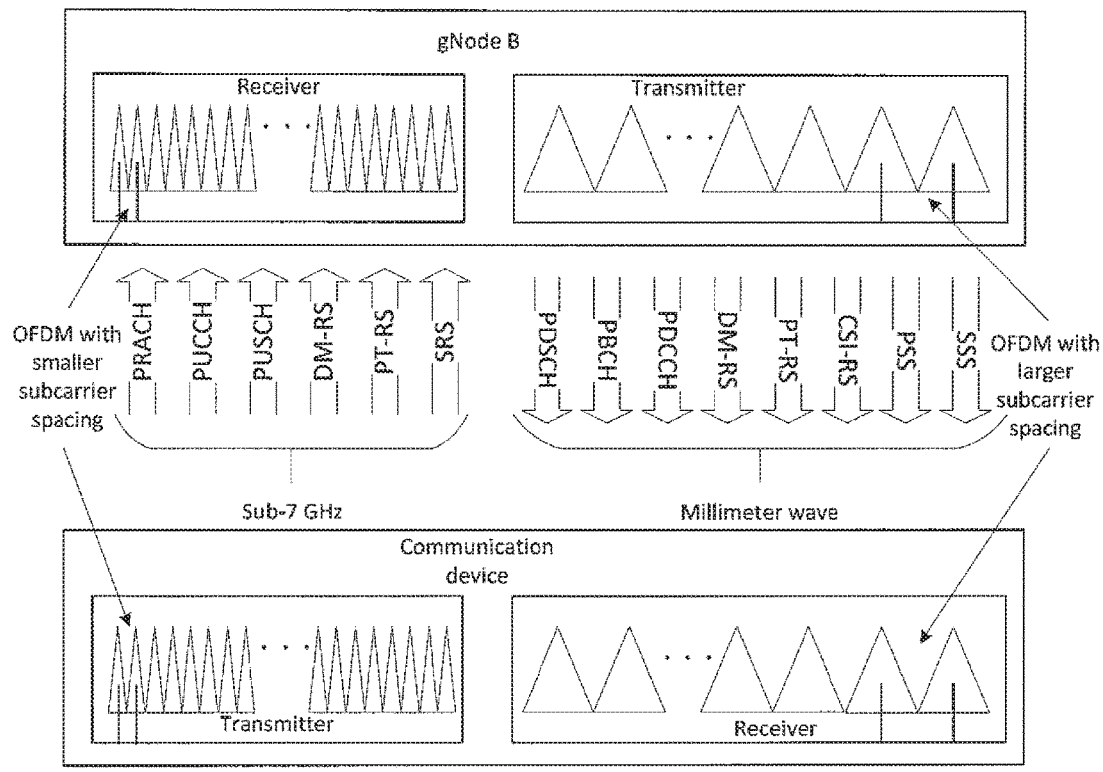
FIG. 7 illustrates physical channels and physical signals according to disclosed embodiments.

FIG. 7 illustrates uplink physical channels and uplink physical signals transmission and reception on the sub-7 GHz spectrum, and downlink physical channels and downlink physical signals transmission and reception on the millimeter wave spectrum according to some disclosed embodiments. An uplink physical channel corresponds to a set of resource elements carrying information originating from higher layers. The uplink physical channels transmitted from a communication device 704 on sub-7 GHz spectrum with a smaller sub-carrier spacing and received by a radio base station 708 on sub-7 GHz spectrum with a smaller sub-carrier spacing includes: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device 704 on sub-7 GHz spectrum with a smaller sub-carrier spacing and received by the radio base station 708 on sub-7 GHz spectrum with a smaller sub-carrier spacing includes Demodulation reference signals (DM-RS), Phase-tracking reference signals (PT-RS) and Sounding reference signal (SRS).

A downlink physical channel corresponds to a set of resource elements carrying information originating from higher layers. The downlink physical channels transmitted from the radio base station 708 on millimeter wave spectrum with a larger sub-carrier spacing and received by the communication device 704 on the millimeter wave spectrum with a larger sub-carrier spacing includes: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station 708 on millimeter wave spectrum with a larger sub-carrier spacing and received by the communication device 704 on the millimeter wave spectrum with a larger sub-carrier spacing includes: Demodulation reference signals (DM-RS), Phase-tracking reference signals (PT-RS) Channel-state information reference signal (CSI-RS) Primary synchronization signal (PSS) and Secondary synchronization signal (SSS).

In certain embodiments, the total bandwidth occupied by the downlink channels and downlink signals using larger sub-carrier spacing on millimeter wave spectrum can be same as the total bandwidth used by the uplink channels and uplink signals using smaller sub-carrier spacing on the sub-7 GHz spectrum. In other embodiments, the total bandwidth occupied by the downlink channels and downlink signals using larger sub-carrier spacing on millimeter wave spectrum can be larger compared to the total bandwidth used by the uplink channels and uplink signals using smaller sub-carrier spacing on the sub-7 GHz spectrum.

In some disclosed embodiments, baseband functions are implemented in an application-specific integrated circuit (ASIC) system-on-a-chip (SoC). In other embodiments, these functions can be implemented on general-purpose processors or in field-programmable gate array (FPGA) integrated circuits.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A method of communication by a wireless communication device, comprising: receiving millimeter wave band downlink signals having an OFDM subcarrier spacing within a range of 120 KHz and 480 KHz, wherein the downlink signals are received in the millimeter wave band only; and transmitting sub-7 GHz band uplink signals having an OFDM subcarrier spacing within a range of 15 KHz and 60 KHz, wherein the uplink signals are transmitted in the sub-7 GHz band only, wherein the bandwidth of the millimeter wave downlink signals is greater than the bandwidth of the sub-7 GHz band uplink signals; wherein the sub-7 GHz band downlink uplink signals have a bandwidth greater than 20 MHz and less than 100 MHz and the millimeter wave band downlink signals have a bandwidth within a range of 200 MHz and 500 MHz range.

2. The method of claim 1, wherein the millimeter wave band downlink signals are transmitted by a radio base station.

3. A method of communication by a radio base station, comprising: transmitting millimeter wave band downlink signals having an OFDM subcarrier spacing within a range of 120 KHz and 480 KHz, wherein the downlink signals are transmitted in the millimeter wave band only; and receiving sub-7 GHz band uplink signals having an OFDM subcarrier spacing within a range of 15 KHz and 60 KHz, wherein the uplink signals are received in the sub-7 GHz band only, wherein the bandwidth of the millimeter wave downlink signals is greater than the bandwidth of the sub-7 GHz band uplink signals; wherein the sub-7 GHz band downlink uplink signals have a bandwidth greater than 20 MHz and less than 100 MHz and the millimeter wave band downlink signals have a bandwidth within a range of 200 MHz and 500 MHz range.

4. The method of claim 3, wherein the sub-7 GHz band uplink signals are transmitted by a communication device.

5. A radio base station, comprising: a first transmitter configured to transmit millimeter wave band downlink signals having a large an OFDM subcarrier spacing within a range of 120 KHz and 480 KHz, wherein the downlink signals are transmitted in the millimeter wave band only; and a first receiver configured to receive sub-7 GHz uplink signals having an OFDM a small subcarrier spacing within a range of 15 KHz and 60 KHz, wherein the uplink signals are received in the sub-7 GHz band only, and wherein the bandwidth of the millimeter wave downlink signals is greater than the bandwidth of the sub-7 GHz band uplink signals; wherein the sub-7 GHz band downlink uplink signals have a bandwidth greater than 20 MHz and less than 100 MHz and the millimeter wave band downlink signals have a bandwidth within a range of 200 MHz and 500 MHz range.

6. The radio base station of claim 5, wherein the first transmitter comprises: a first signal processing circuit configured to generate the millimeter wave band downlink signals; a power amplifier configured to amplify the millimeter wave band downlink signals; and a transmit antenna array configured to transmit the millimeter wave band downlink signals.

7. The radio base station of claim 5, wherein the first receiver comprises: an antenna array configured to receive the sub-7 GHz band uplink signals; a low noise amplifier configured to amplify the sub-7 GHz band uplink signals; and a second signal processing circuit configured to process the sub-7 GHz band uplink signals.

8. A communication device, comprising: a first receiver configured to receive millimeter wave band downlink signals having an OFDM subcarrier spacing within a range of 120 KHz and 480 KHz, wherein the downlink signals are received in the millimeter wave band only; and a first transmitter configured to transmit sub-7 GHz uplink signals having an OFDM subcarrier spacing within a range of 15 KHz and 60 KHz, wherein the uplink signals are transmitted in the sub-7 GHz band only, and wherein the bandwidth of the millimeter wave downlink signals is greater than the bandwidth of the sub-7 GHz band uplink signals; wherein the sub-7 GHz band downlink uplink signals have a bandwidth greater than 20 MHz and less than 100 MHz and the millimeter wave band downlink signals have a bandwidth within a range of 200 MHz and 500 MHz range.

9. The communication device of claim 8, wherein the first transmitter comprises: a first signal processing circuit configured to generate the sub-7 GHz band uplink signals; a power amplifier configured to amplify the sub-7 GHz band uplink signals; and a transmit antenna array configured to transmit the sub-7 GHz band uplink signals.

10. The communication device of claim 8, wherein the first receiver comprises: an antenna array configured to receive the millimeter wave band downlink signals; a low noise amplifier configured to amplify the millimeter wave band downlink signals; and a second signal processing circuit configured to process the millimeter wave band downlink signals.

* * * * *